United States Patent Office 3,308,748
Patented Mar. 14, 1967

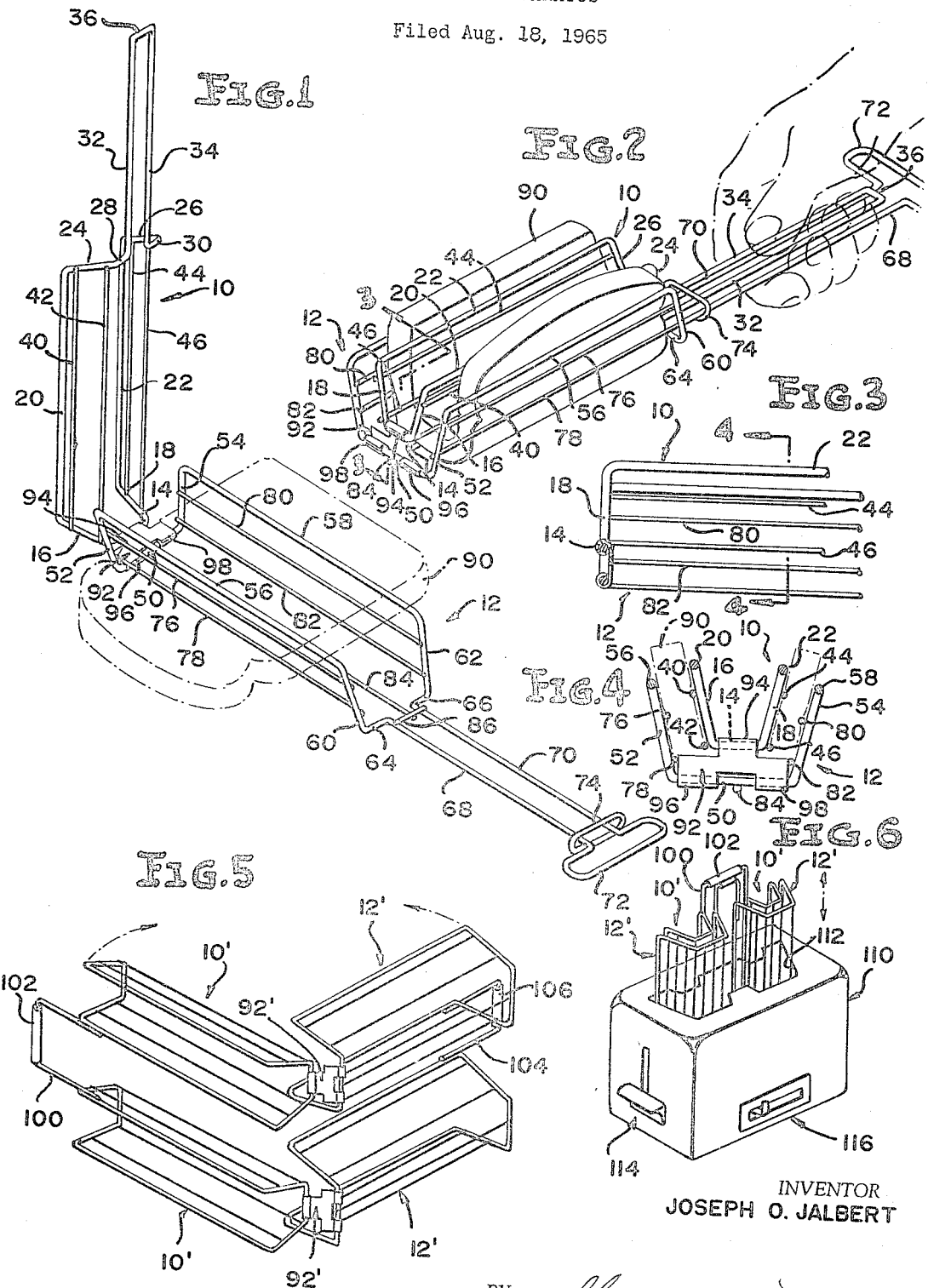

3,308,748
TOASTER APPARATUS
Joseph O. Jalbert, 401 W. Madison Ave.,
Dumont, N.J. 07628
Filed Aug. 18, 1965, Ser. No. 480,613
2 Claims. (Cl. 99—402)

The present invention relates to new and novel toaster apparatus, and more particularly to toaster apparatus adapted to make a shaped toast.

The present invention is particularly adapted for making shaped toast for use with conventional hot dogs or other types of fillings wherein it is desired to provide a toast of generally U-shaped cross sectional configuration so that it is adapted to readily hold such contents therewithin. The shaped toast is made from a conventional flat piece of slice baked bread which is deformed into a generally U-shaped configuration and toasted while in such shape. This has the advantage of effectively forming a shaped toast, whereas if the piece of bread is toasted in its flat condition, any attempt to then deform the toast into the desired shape will result in cracking and breaking thereof in an undesirable manner.

Efforts have been made in the prior art to provide toaster apparatus for accomplishing this end result, such prior art structures employing solid arcuate plates for this purpose. These types of arrangements have proved unsatisfactory due to the fact that such solid plates do not permit ready inspection of the article to be toasted and thereby restrict the amount of control as to the degree of toasting obtained. Additionally, the moisture within the bread being toasted is confined within such solid plates and effective toasting is not obtained, but rather the bread is baked.

The present invention provides a number of improved results over prior art constructions since an open framework type construction is employed which is readily portable and can be held in the hand for toasting over any suitable source of heat. In a modified form of the invention, this open type framework can be inserted directly within a conventional type pop-up toaster similar to those now on the market and having certain minor modifications therein.

The open framework type construction of the present invention enables one to readily inspect the degree of toasting and thereby obtain an accurate control thereof. The construction is such that a piece of bread may be readily inserted into operative position and removed from the apparatus as desired.

Additionally, the open framework construction of the present invention enables proper toasting to be obtained, and the moisture is not confined within the apparatus as in prior art arrangements.

An object of the present invention is to provide new and novel toaster apparatus for toasting a slice of baked bread and the like into a desired shape which is generally U-shaped.

Another object of the invention is the provision of toaster apparatus which is portable and which can be held in the hand for toasting over any suitable source of heat.

Still another object of the invention is to provide toaster apparatus wherein the article to be toasted may be readily inspected to accurately control the degree of toasting.

Still a further object of the invention is the provision of toaster apparatus of such a construction that the article to be toasted can be readily inserted into and removed therefrom.

Yet another object of the invention is to provide toaster apparatus wherein the moisture within the article to be toasted is not confined such that proper and effective toasting can be obtained.

Yet a further object of the invention is the provision of toaster apparatus incorporated in a conventional pop-up toaster mechanism.

Other objects and many attendant advantages of the invention will become more apparent when considered in connection with the specification and accompanying drawings, wherein:

FIG. 1 is a top perspective view of the first form of the invention illustrating the portions of the apparatus in separated relationship;

FIG. 2 is a top perspective view of the apparatus shown in FIG. 1 in operative clamped relationship with an article to be toasted therewithin;

FIG. 3 is a sectional view taken substantially along line 3—3 of FIG. 2 looking in the direction of the arrows;

FIG. 4 is a sectional view taken substantially along line 4—4 of FIG. 3 looking in the direction of the arrows;

FIG. 5 is a top perspective view of a modified form of the invention showing the portions thereof in inoperative spaced relationship; and FIG. 6 shows the structure of FIG. 5 in a clamped adjacent relationship and disposed in association with a conventional pop-up toaster.

Referring now to the drawings wherein like reference characters designate corresponding parts throughout the several views, the first modification illustrated in FIGS. 1–4 inclusive comprises first and second portions indicated generally by reference numerals 10 and 12, each of these portions being of an open framework construction. In a typical example, these portions may each be constructed of aluminum wire sprayed with Teflon, although any suitable framework members may be employed. It should be understood that the various framework portions as described hereinafter may either by formed by bending single pieces into a particular shape or by providing separate pieces which are rigidly interconnected with one another as by brazing or the like.

Portion 10 includes as seen in the drawings a forward generally horizontally extending portion 14 which is connected with upwardly and outwardly flared portions 16 and 18 which in turn connect with longitudinally extending substantially parallel portions 20 and 22. Portions 20 and 22 in turn join with downwardly and inwardly tapering portions 24 and 26 which are substantially parallel with portions 16 and 18 respectively. These portions 24 and 26 in turn join with inwardly extending portions 28 and 30 respectively which then join with longitudinally rearwardly extending substantially parallel portions 32 and 34 which are connected at their rearmost ends by a cross portion 36.

It will be noted that the aforementioned members of portion 10 are main frame members of a substantial dimension. A pair of support members 40 and 42 are interconnected at their opposite ends with members 16 and 24, and a similar pair of support members 44 and 46 have their opposite ends interconnected with members 18 and 26. It will be noted that these support members are generally parallel with one another and are of a smaller cross sectional dimension than the main frame members of portion 10. It will be noted that the main frame members of the portion provide the rigid portion of the framework, and the support members serve as auxiliary support portions for supporting the article to be toasted in the proper configuration. It should also be noted that the various members of portion 10 are spaced apart from one another a distance greater than the cross sectional dimension thereof so as to provide substantial spaces between the members so that an open framework having a major amount of free space is afforded whereby only sufficient framework members are provided for holding the article to be toasted in position while permitting the maximum area of the article to be toasted to be exposed to a source of heat for obtaining the desired toasting thereof.

The second portion 12 includes a forward generally horizontally extending portion 50 which is interconnected with a pair of upwardly and outwardly flared portions 52 and 54 which in turn join with longitudinally extending substantially parallel portions 56 and 58. These portions 56 and 58 in turn join with downwardly and inwardly tapered portions 60 and 62 which are disposed substantially parallel with the aforementioned portions 52 and 54 respectively.

The lower ends of portions 60 and 62 join with inwardly extending portions 64 and 66 which in turn join with longitudinally extending generally parallel portions 68 and 70. The rear ends of portions 68 and 70 are joined by a loop portion 72. A clamping means in the form of an elongated link 74 is slidably positioned about portions 68 and 70 and is adapted to be slid into the operative clamped relationship as seen in FIG. 2 when the two portions are disposed in operative position for holding an article to be toasted.

The aforementioned members of the second portion 12 comprise the main frame members of this portion, and auxiliary support members 76 and 78 are connected between members 52 and 60 while a second pair of support members 80 and 82 are interconnected between members 54 and 62.

A further support member 84 is interconnected between member 50 and a cross member 86 which is connected between members 68 and 70.

It will be noted that portions 10 and 12 are substantially complementary to one another and as seen particularly in FIG. 4, each is cradle-like or of generally U-shaped cross sectional configuration such that when disposed in the operative spaced relationship shown in FIG. 4, a piece of bread is adapted to be deformed into a generally U-shaped configuration. Such piece of bread is indicated by reference numeral 90 and is shown in phantom lines in FIGS. 1 and 4 and in solid lines in FIG. 2 wherein it is shown in its clamped relationship ready to be toasted.

A hinged member is indicated generally by reference numeral 82, this hinge member being for example formed of a flat sheet of metal which is stamped out and has curled-over portions for embracing certain parts of the two portions 10 and 12. As illustrated, a first curled-over portion 94 of the hinge is wrapped around member 14 of portion 10 so as to permit relative rotation therebetween and yet to hold the members in operative relationship with respect to one another. A pair of spaced curled portions 96 and 98 of the hinge are wrapped around spaced portions of member 50 of portion 12 so as to permit relative rotation therebetween and yet to maintain the members in operative relationship. It is apparent that hinge means 92 serves to pivotally interconnect portions 10 and 12 of the apparatus and enables these portions to be pivoted from the open inoperative position shown in FIG. 1 to the operative clamped relationship shown in FIG. 2 wherein the portion 10 is adapted to nest within the portion 12 and to be spaced therefrom so as to define a substantially U-shaped space therebetween for receiving a piece of bread 90 or the like.

The apparatus shown in FIGS. 1–4 is adapted to be held in the hand as indicated in FIG. 2, and the open framework construction is such as to rapidly dissipate the heat so that it can be readily held in the hand even when the bread to be toasted is held over or adjacent a source of heat.

While the apparatus shown in FIGS. 1–4 inclusive has been illustrated as being of such a construction so as to accommodate a single piece of bread, it should be understood that this basic construction can be duplicated so that a plurality of such arangements can be interconnected lengthwise with one another, in side-by-side relationship or both so that a plurality of toaster devices can be simultaneously employed for toasting a plurality of pieces of bread.

Referring now particularly to FIGS. 5 and 6 of the drawings, a modified form of the invention is illustrated. As seen in FIG. 5, this modified form of the invention includes a pair of first portions 10′, 10′ and a pair of second portions 12′, 12′. Portions 10′ are substantially identical with the construction of portion 10 previously described with the exception that the handle portions thereof have been eliminated and in place of the handle portions a member extending across the end thereof is provided. In a similar manner, the portions 12′ are substantially identical with the portion 12 previously described with the exception that the handle portions have been eliminated and the end portion thereof has been extended across where the handle portions have been removed.

The portions 10′, 10′ are pivotally interconnected with the portions 12′, 12′ by hinge members 92′ which are substantially identical with the hinge members 92 previously described. It is apparent that these portions 10′ and 12′ will cooperate with one another in a manner identical to that previously described.

Portions 10′, 10′, are interconnected with one another by a U-shaped handle portion 100 which may have a body of heat insulation 102 disposed thereabout. The portions 12′, 12′ are interconnected with one another by a U-shaped handle portion 104 which may have a body of heat insulating material 106 thereabout.

In FIG. 5 the open framework is illustrated in its open position, and in FIG. 6 it is illustrated in its closed clamped position for holding a plurality of pieces of bread therewithin. As seen in FIG. 6, a conventional pop-up toaster 110 is provided which is adapted to be connected with a suitable source of electrical energy, and an opening 112 is adapted to receive the framework as shown in FIG. 5. Opening 112 may be substantially complementary to the outer configuration of the open framework for receiving the framework therewithin, and it will be understood that the electrical heating elements within toaster 110 will be disposed closely adjacent opening 112 so as to provide even toasting of the pieces of bread supported within the framework.

The toaster 110 is provided with the conventional controls such as a portion 114 adapted to lower and raise the framework within the toaster mechanism as it usually lowers and raises the pieces of bread themselves. A control means 116 is provided for controlling the amount of toasting, or the time duration within the toaster mechanism.

It is apparent from the foregoing that there is provided according to the present invention new and novel toaster apparatus which is especially adapted for toasting a slice of baked bread and the like into a desired configuration which in the present invention is generally U-shaped. The apparatus as seen in FIGS. 1–4 is readily portable and can be held in the hand for toasting over any suitable source of heat. The open framework construction enables the article being toasted to be readily inspected to accurately control the degree of toasting, and the construtction is such as to permit ready insertion and removal of the article being toasted. The open framework construction further enables proper toasting to be obtained in contrast to the solid plate-like construction of the prior art wherein the moisture is confined therewithin. In addition, the open framework may be employed with a conventional pop-up toaster mechanism as illustrated in the modified form of the invention.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly coperative equivalents are therefore intended to be embraced by those claims.

I claim:

1. Toaster apparatus for making a shaped toasted article comprising cradle-like wire grills nestable in spaced relation, a wire defining the outline of each cradle-like grill having at each end of the grill a straight bottom portion and outwardly and upwardly flaring portions which have their corresponding upper ends connected by parallel longitudinally extending straight wire side portions, a spacing element at one end of said nestable grills hinging the corresponding bottom wire portion of each cradle to each other, and the other end of each cradle-like grill having an outwardly extending handle member rigidly connected thereto for clamping said grills in nested relation against the article to be toasted, whereby said toasted article will be trough shaped with a substantially flat bottom.

2. Toaster apparatus for making shaped toasted articles comprising two pairs of parallel cradle-like wire grills nestable in spaced relation, a wire defining the outline of each cradle-like grill having at each end of the grill a straight bottom portion and outwardly and upwardly extending portions, said last named portions having their corresponding upper ends connected by parallel longitudinally extending straight wire side portions which define a plane, a spacing element at one end of said nestable grills hinging the corresponding bottom wire portion of each corresponding cradle-like grill of each pair together, and the other end of each pair of cradle-like grills having a handle rigidly connected to the inner adjacent straight wire portions of adjacent cradle-like grills, and said handle extending outwardly in the plane of said wires and cooperating with the handle of the other pair of grill elements to hold said pairs in nested spaced relation with the article to be toasted and shaped clamped therebetween, whereby said toasted articles will be trough shaped with a substantially flat bottom.

References Cited by the Examiner

UNITED STATES PATENTS

| | | | |
|---|---|---|---|
| 268,047 | 11/1882 | Sherman | 99—402 |
| 890,219 | 6/1908 | Cook | 99—402 |
| 1,228,956 | 6/1917 | Noonan. | |
| 1,733,137 | 10/1929 | Spang | 99—407 X |
| 2,352,447 | 6/1944 | Powers et al. | 99—427 X |
| 2,570,374 | 10/1951 | Pompa | 99—416 |
| 2,604,841 | 7/1952 | Kirby | 99—383 |
| 2,827,847 | 3/1958 | Shafter | 99—427 X |
| 2,962,957 | 12/1960 | Bork | 99—402 |
| 3,008,601 | 11/1961 | Cahne | 220—64 |
| 3,020,826 | 2/1962 | Silva | 99—426 |

FOREIGN PATENTS

| | | |
|---|---|---|
| 656,190 | 1/1963 | Canada. |

BILLY J. WILHITE, *Primary Examiner.*